(12) United States Patent
Beranek et al.

(10) Patent No.: US 11,861,446 B2
(45) Date of Patent: Jan. 2, 2024

(54) METHOD AND APPARATUS FOR USING ENCODED INFORMATION FOR MATERIAL PREPARATION AND ANALYSIS EQUIPMENT

(71) Applicant: Illinois Tool Works Inc., Glenview, IL (US)

(72) Inventors: Sarah Marie Beranek, Glenview, IL (US); Matthew R. Callahan, Deerfield, IL (US); Jill M. Dreschler, Round Lake, IL (US); Jeffrey E. Joray, Lake Villa, IL (US); Christopher J. Sensmeier, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/516,646

(22) Filed: Jul. 19, 2019

(65) Prior Publication Data
US 2020/0034584 A1 Jan. 30, 2020

Related U.S. Application Data

(60) Provisional application No. 62/702,381, filed on Jul. 24, 2018.

(51) Int. Cl.
*G06K 7/10* (2006.01)
*G06K 7/00* (2006.01)

(52) U.S. Cl.
CPC ....... *G06K 7/10237* (2013.01); *G06K 7/0004* (2013.01); *G06K 7/0095* (2013.01); *G06K 7/1097* (2013.01)

(58) Field of Classification Search
None
See application file for complete search history.

(56) References Cited

U.S. PATENT DOCUMENTS

| | | | |
|---|---|---|---|
| 6,997,384 B2 | 2/2006 | Hara | |
| 8,296,477 B1 | 10/2012 | Polk | |
| 8,924,712 B2 | 12/2014 | Varadarajan | |
| 8,935,777 B2 | 1/2015 | Desoto | |
| 9,611,625 B2 | 4/2017 | Koetz | |
| 9,792,612 B2 | 10/2017 | Dugan | |
| 10,692,371 B1 * | 6/2020 | Nix | G07C 5/008 |
| 2003/0228163 A1 * | 12/2003 | Yokoi | G03G 15/55 399/27 |
| 2004/0128021 A1 * | 7/2004 | Klekotka | H01J 37/32935 700/204 |

(Continued)

FOREIGN PATENT DOCUMENTS

| | | |
|---|---|---|
| CN | 107945237 | 4/2018 |
| EP | 20040084443 | 1/2014 |
| JP | 2013237133 A | 11/2013 |

OTHER PUBLICATIONS

Despatch Thermal Processing Technology, Protocol Manager, Monitoring and Data Acquisition Software, 2016 (2 pgs).

(Continued)

*Primary Examiner* — Fateh M Obaid
(74) *Attorney, Agent, or Firm* — McAndrews, Held & Malloy, Ltd.

(57) ABSTRACT

Provided is a disclosure for using indicia to handle information for use in material preparation and analysis equipment.

19 Claims, 5 Drawing Sheets

(56) References Cited

U.S. PATENT DOCUMENTS

| | | | |
|---|---|---|---|
| 2005/0170356 A1* | 8/2005 | Kureshy | G01N 35/1016 |
| | | | 435/7.1 |
| 2007/0024463 A1* | 2/2007 | Hall | G05B 19/4183 |
| | | | 340/572.1 |
| 2009/0058617 A1* | 3/2009 | Wu | G01N 35/00732 |
| | | | 340/10.41 |
| 2009/0108057 A1 | 4/2009 | Mu | |
| 2013/0024301 A1* | 1/2013 | Mikan | G06K 7/10366 |
| | | | 705/16 |
| 2014/0107853 A1 | 4/2014 | Ashinghurst | |
| 2014/0201089 A1* | 7/2014 | Ling | G06Q 10/20 |
| | | | 705/305 |
| 2015/0248092 A1* | 9/2015 | Takahashi | G03G 21/02 |
| | | | 399/79 |
| 2015/0324681 A1* | 11/2015 | Mats | G06K 19/07766 |
| | | | 235/492 |
| 2016/0321480 A1* | 11/2016 | Hamlin | G16Z 99/00 |
| 2017/0270323 A1* | 9/2017 | Butler | G06K 19/07749 |
| 2017/0293271 A1* | 10/2017 | Glaser | G05B 13/042 |
| 2017/0320183 A1* | 11/2017 | Rola | B23Q 17/2457 |
| 2019/0101463 A1* | 4/2019 | Fly | B25H 3/028 |
| 2020/0219335 A1* | 7/2020 | Gintz | G06F 9/4411 |

OTHER PUBLICATIONS

Buehler, AbrasiMatic™ 450, Automatic Abrasiv Cutter, Solutions for Materials Preparation, Testing and Analysis, 2013 (12 pgs).

Int'l Search Report and Written Opinion Appln No. PCT/US2019/043218 dated Nov. 28, 2019 (23 pgs).

Notice of Reasons forRejection dated Apr. 20, 2023 in Japanese Patent Application No. 2021-503913 (2 pgs).

\* cited by examiner

METHOD AND APPARATUS FOR USING ENCODED INFORMATION FOR MATERIAL PREPARATION AND ANALYSIS EQUIPMENT

RELATED APPLICATION(S)/CLAIM TO PRIORITY

This application claims priority to the U.S. Provisional Application 62/702,381, filed on Jul. 24, 2018, titled "METHOD AND APPARATUS FOR USING ENCODED INFORMATION FOR MATERIAL PREPARATION AND ANALYSIS EQUIPMENT," the disclosure of which is incorporated herein in its entirety by reference.

BACKGROUND

The present disclosure relates to encoded information, and more particularly, to a method and apparatus for using encoded information for material preparation and analysis equipment.

Limitations and disadvantages of conventional approaches to using barcodes will become apparent to one of skill in the art, through comparison of such approaches with some aspects of the present method and system set forth in the remainder of this disclosure with reference to the drawings.

SUMMARY

Methods and apparatus are provided for using encoded information for material preparation and analysis equipment, substantially as illustrated by and described in connection with at least one of the figures, and as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION

Figure 1:
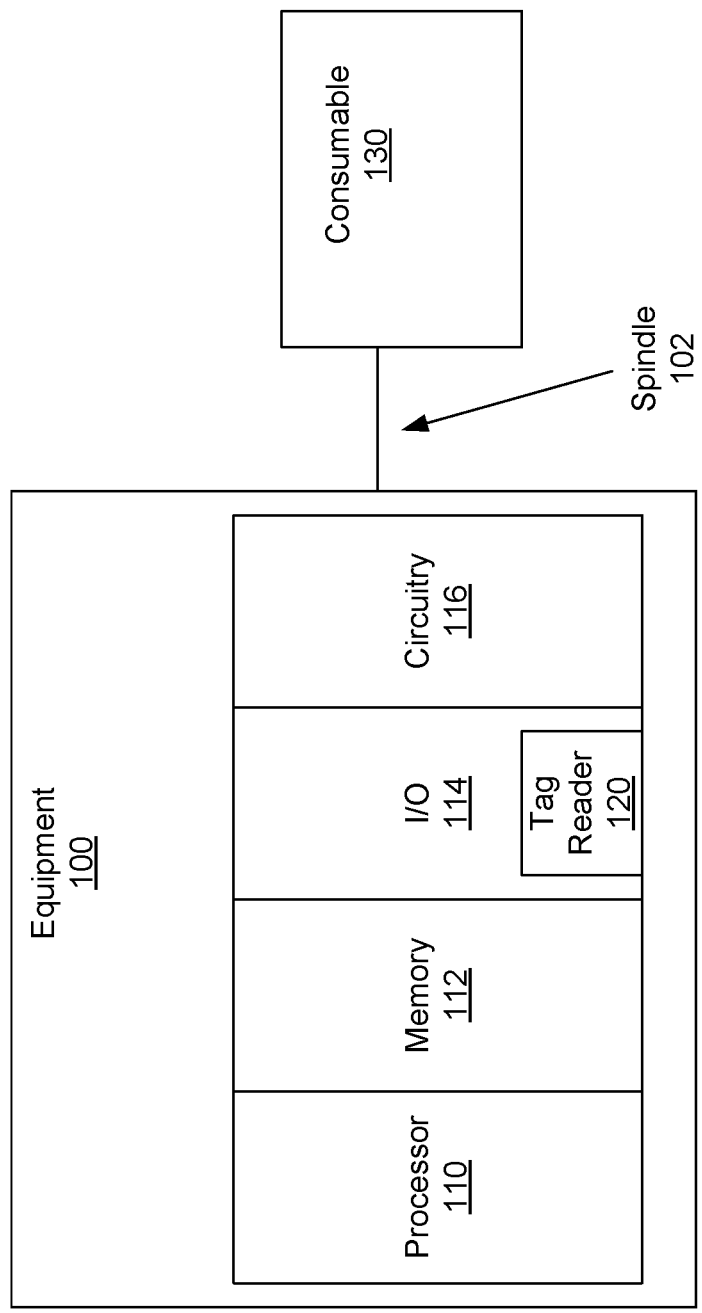
FIG. 1 illustrates a block diagram of an example equipment with a tag reader in accordance with aspects of this disclosure.

While example methods and apparatus are disclosed, modifications to the example methods and apparatus may not be described in detail as they may be well known to a person of ordinary skill in the art.

A piece of equipment, such as, for example, a material preparation and analysis equipment, may be able to handle many different types of accessories, where each accessory may need to have different parameter settings or the same accessory may need to have different parameter settings for use with different samples. For example, if the equipment is a cutting device that uses an abrasive cutting wheel to cut samples or workpieces, the desired constant parameter may be a surface speed of the cutting wheel, or linear speed of the cutting wheel at its edge. The surface speed may vary with different samples being cut, with different type of cutting wheel, different type of abrasive, disposition of the abrasive on the cutting wheel, whether liquid coolant is used, type of liquid coolant used, etc. Furthermore, the initial size of the cutting wheel is needed such that the initial rotational speed of the cutting wheel can be set for the correct surface speed.

Accordingly, some parameters may need to be entered or set. Disclosed methods and apparatus provide for less onerous ways to enter the various parameters, as well as reducing errors when entering the parameters. The task of keeping track of the parameters used for a given sample may also be made easier by the disclosed methods and apparatus.

Traditionally, the user is required to have advanced knowledge of machine and sample properties and/or have access to such knowledge to input the correct parameters. This information may now be combined with the consumable information to ensure safe and effective operation. Accordingly, information can more easily be passed to the machine. This allows the machine to provide greater process control and less user intensive interface, leading to fewer human errors, and a higher likelihood of success by the end user. Setup speed may be improved as less time is needed to set machine parameters. In addition, scanning work orders, user badges, and similar items may allow for the machine to provide more accurate job costing and productivity feedback.

Data backup may also be provided by transferring parameters/information from machine to machine. Data transfer may also be performed easily by sending settings via, for example, barcode, QR code, or other indicia that is electronically readable to individual devices/equipment or to multiple devices/equipment. The QR code is an example of a multi-dimensional barcode.

As used herein, the term "tag" refers to a physical machine-readable label storing machine-readable data. Tags may be implemented of electronic indicia, such as single-dimensional barcodes or multi-dimensional barcodes, and/or using electromagnetic waves emitted by the physical label, such as via radio frequency communications. The data stored in a tag may be extracted (e.g., read, received, etc.) using unidirectional communications (e.g., a camera or optical code scanner reading a printed or otherwise physically affixed indicia, data broadcast by the tag) or bidirectional communications (e.g., interrogation of a communications device and a corresponding response containing the data).

FIG. 1 illustrates a block diagram of an example equipment with a tag reader in accordance with aspects of this disclosure. Referring to FIG. 1, there is shown an equipment 100 including processing circuitry 110, memory 112, input/output (I/O) interface 114, and/or circuitry 116. The equipment 100 may be any equipment that may be used for different purposes for treating a material, such as, for example, material preparation and analysis. For example, the equipment 100 may be a cutting or sectioning saw, a grinder or polisher, a microscope or other analysis tool, a hardness tester, etc. Accordingly, an example of the equipment 100 may be a cutting device that uses an abrasive cutting wheel. The equipment 100 may also be used with, for example, a cloth or grinding disc. The equipment 100 may also be used with, for example, hardness test blocks, which may be used for regular calibration of the equipment 100. When the test block is out of specification, that test block may be flagged so that it is not used.

A consumable product used in conjunction with the equipment 100 is referred to herein as the consumable 130. In some equipment 100, the consumable 130 may be rotated via, for example, a spindle 102 driven by an actuator (not shown), which may be controlled by the processing circuitry 110.

The processing circuitry 110 may be any type of processor or logic circuitry that is capable of executing instructions stored in a memory, including the memory 112, and/or otherwise performing logic functions based on inputs. Example processors include central processing units (CPUs), systems-on-a-chip (SOCs), field programmable gate arrays (FPGAs), application-specific integrated circuits (ASICs), discrete logic, and/or any other type of controller, processor and/or, more generally, logic circuitry.

The memory 112 may comprise volatile and non-volatile memory, including mass storage devices. The memory 112 may be used to store information received by or input into the equipment 100, and information processed by the processing circuitry 110. For example, the memory 112 may store equipment parameters associated with identifiers or codes that may be attached or otherwise associated with the consumable 130. The identifiers or codes may be unique (e.g., to uniquely identify a consumable, test sample, or other element) and/or non-unique (e.g., the same identifier is attached to multiple instances of the same type of consumable). Additionally or alternatively, the memory 112 may store measured test data in association with identifiers or codes. For example, test conditions and/or results may be stored in the memory 112 in association with unique or non-unique codes for subsequent analysis.

The I/O interface 114 is described in more detail below with reference to FIG. 2. The circuitry 116 may comprise various hardware circuitry and/or devices that may be needed for operation of the equipment 100. For example, the circuitry 106 may comprise an actuator to rotate the consumable 130.

The I/O interface 114 may comprise a tag reader 120 that may be used to read indicia, such as RFID tags, NFC tags, barcodes, multi-dimensional barcodes such as, for example QR codes, etc. The tag reader 120 is shown as being part of the I/O interface 114 for ease of explanation, however, the tag reader 120 may be an integrated part of the equipment 100 or a separate unit from the equipment 100 that is able to communicate with the equipment 100, either via a wired and/or wireless communication. The wired communication may, for example, use any of the different protocols such as, for example, USB, Firewire, TCP/IP, SCSI, IDE, or other protocols that may be appropriate for the cutting device 100. The wireless communication may use any of the different protocols such as, for example, Wi-Fi, Bluetooth, NFC (near field communication), or other protocols that may be appropriate for the tag reader 120. In some examples, the I/O interface 114 may be communicatively coupled to another device (e.g., a smartphone, a tablet computer, a desktop computer, a laptop computer, etc.) capable of reading the indicia and communicating the content of the indicia to the equipment 100.

Figure 2:
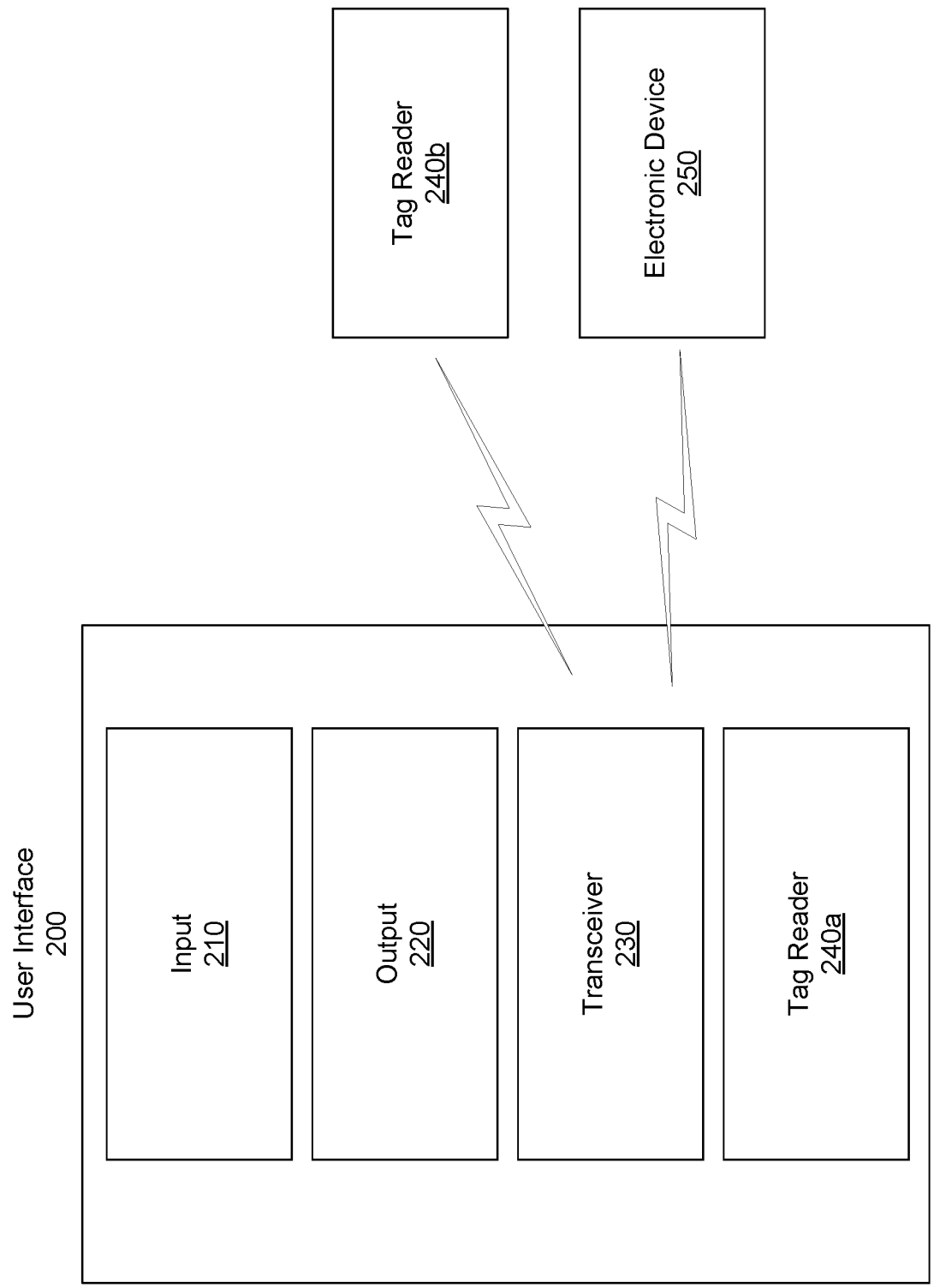
FIG. 2 is block diagram of an example user interface of an equipment in accordance with aspects of this disclosure.

FIG. 2 is block diagram of an example user interface of an equipment in accordance with aspects of this disclosure. Referring to FIG. 2, there is shown the example user interface 200 that includes an input interface 210, an output interface 220, and a transceiver 230. The user interface 200 may also include a tag reader 240*a* that may be similar to the tag reader 120. The user interface 200 may be used to implement the I/O device 114 of FIG. 1. The user interface 200 may be a part of the equipment 100. The example input interface 210 may include any type of input device, such as a keyboard, a pointing device (e.g., a mouse, a trackpad), a microphone, a camera (e.g., gesture-based input), a touchscreen, buttons that can be rotated and/or pushed, sliding knobs, and/or any other type of user input and/or output device. The example output interface 220 includes any type of video output device such as, for example, an LCD display, an LED display, etc., tactile feedback devices that may vibrate, audio output device such as speakers, and/or any other output devices that may be used to provide information or notice. The output interface 220 may display, for example, status/commands that may be entered for the cutting device 100.

The example transceiver 230 communicates via wired and/or wireless communication with other electronic devices. The wired communication may, for example, use any of the different protocols such as, for example, USB, Firewire, TCP/IP, SCSI, IDE, or other protocols that may be appropriate for the cutting device 100. The wireless communication may use any of the different protocols such as, for example, Wi-Fi, Bluetooth, NFC (near field communication), or other protocols that may be appropriate for the cutting device 100.

The transceiver 230 may be used to control and/or view the status of the equipment 100. For example, an electronic device 250 may be used to enter parameters for a cutting tool, such as, for example, the initial diameter of the cutting wheel, the desired surface speed, etc. if the equipment 100 is a cutting device with a cutting wheel. The transceiver 230 may also allow tables, instructions, etc. to be downloaded, for example, to the equipment 100.

Additionally or alternatively, the parameters may be determined by reading indicia on the cutting wheel and/or on the material under test using the tag reader 240*a*. The tag reader 240 may read indicia, such as RFID tags, NFC tags, barcodes, multi-dimensional barcodes such as, for example, QR codes, etc., which may be present on the consumable 130, packaging of the consumable 130, on the material under test, on the packaging of the material under test, and/or on a tag attached to the material under test. The tag reader 240*a* may be able to read various different types of encoded information, as well as plain text. The information read from the indicia may be transmitted to the equipment 100 to be processed and/or stored by the processing circuitry 110 and the memory 112, respectively. Therefore, the tag reader 240*a* may be used to scan and download tables, instructions, etc. The instructions may be displayed for the user of the equipment 100.

For example, if the equipment 100 is a cutting device, the memory 112 may store parameters such as the sample material being cut, the overall part number of the material being cut, abrasive material type on the abrasive cutting wheel, size of the cutting wheel, concentration of the abrasive material on the abrasive cutting wheel, thickness of the abrasive cutting wheel, bonding agent material type, bonding agent material hardness, etc., in association with a code that would be attached or otherwise associated with (e.g., on the packaging of) a cutting wheel. The input interface 210 and/or the transceiver 230 may enable an authorized changes to the data associated with the codes stored in the memory 112. For example, while a set of parameters may be stored as the default for a given code, actual operating conditions may justify changing of one or more of the parameters for that code.

The tag reader 240*a* may be a built-in module (e.g., a built-in barcode reader, a camera for recognizing barcodes and/or multi-dimensional barcodes such as, for example, QR codes, an NFC reader, etc.) where the indicia is scanned over it. Additionally or alternatively, an attached tag reader 240*a* may be provided with a wired connection from the tag reader 240*a* to, for example, the user interface 200 to enable reading of indicia such as those, for example, that are impractical to move to the built-in module.

The electronic device 250 may also display, for example, status of the equipment 100 on the electronic device 250. For example, the status may be the status that may be displayed on the output interface 220 and/or other information that may not be displayed on the output interface 220.

There may also be in place of, or in addition to, the tag reader 240*a*, a detached tag reader 240*b*. The detached tag reader 240*b* may be similar to the tag reader 240*a*. The detached tag reader 240*b* may communicate with the transceiver 230 of the user interface 200 similarly as the electronic device 250. When wired communication is used for the detached tag reader 240*b*, a cord may be plugged into an appropriate socket in, for example, the user interface 200. The socket may be in any part of the equipment 100. Accordingly, the user interface 200, and its component blocks, may be logical blocks rather than physical blocks that denote a physical location. Generally, the block diagrams in FIGS. 1 and 2 may be logical blocks.

Figure 3:
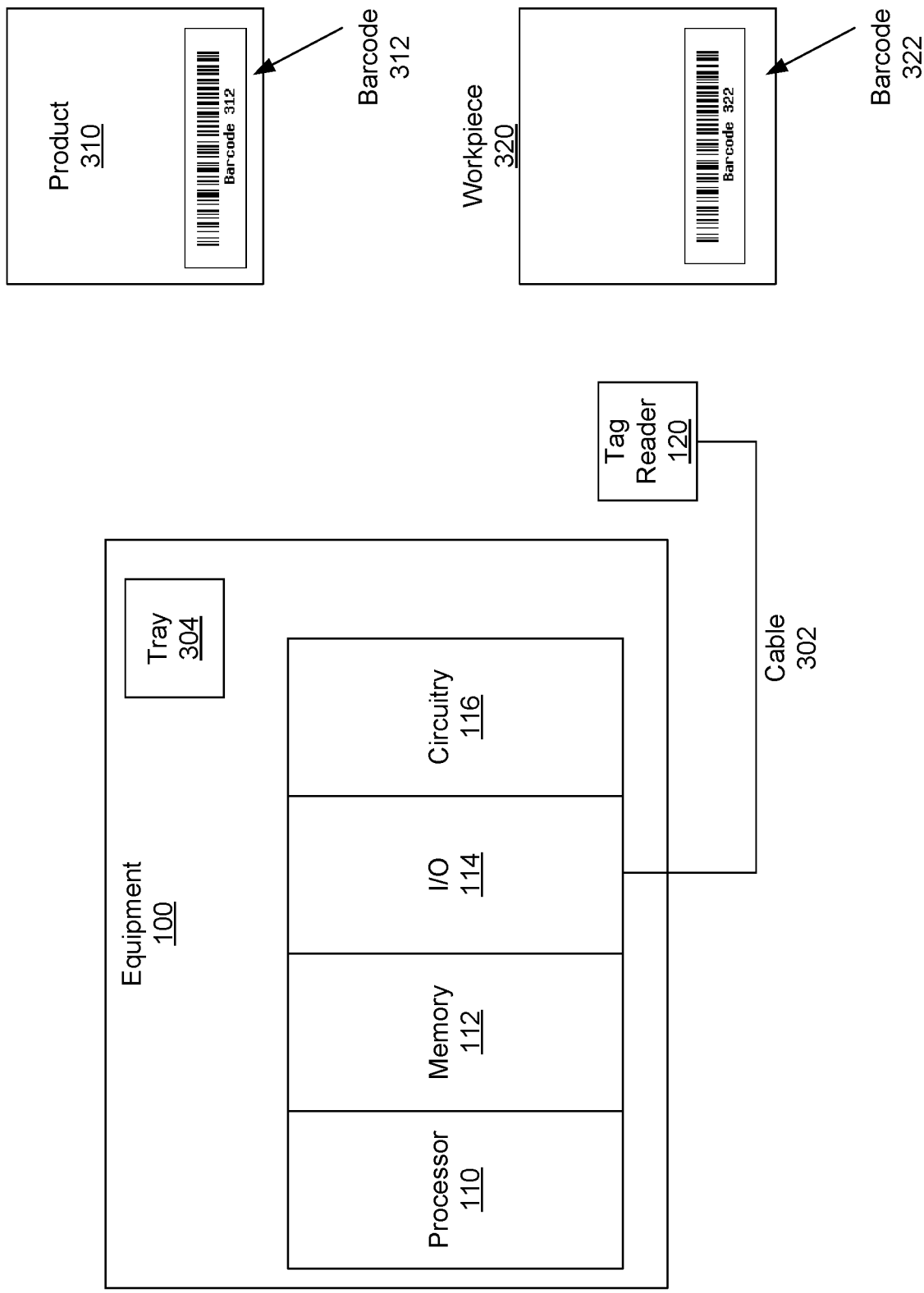
FIG. 3 illustrates a block diagram of an example tag reader reading an indicia in accordance with aspects of this disclosure.

FIG. 3 illustrates a block diagram of an example tag reader reading an indicia in accordance with aspects of this disclosure. Referring to FIG. 3, there are shown the equipment 100 and the tag reader 120 communicating with the I/O interface 114 via the cable 302. The tag reader 120 may be used to read, for example, the barcode 312 on the consumable 130. Additionally or alternatively, the barcode 312 may be located on the packaging, documentation, and/or any other location associated with the consumable.

In one example, the consumable 130 is a cutting wheel mounted to a sectioning saw, and the parameters may be set to rotate the cutting wheel at an appropriate rotational speed for a desired surface speed.

In another example, the consumable 130 is a polishing cloth or grinding disc, which may not provide obvious visual cues to a user that the cloth or disc is reaching the end of its useful life limit. The processing circuitry 110 monitors the remaining useful life of the cloth or disc and indicates to the user (e.g., via the output interface 220) to change the cloth or disc when the remaining useful life is below a threshold. The processing circuitry 110 may monitor the useful life by, for example, keeping track of how long the consumable is used. The consumable use may be an estimate based on how long the consumable has been attached to the equipment 100, the time the consumable 130 has been in use, the parameters or conditions under which the consumable 130 has been used, and/or other criteria.

If the consumable 130 is tagged with a non-unique code, the processing circuitry 110 may reset the usage monitor each time a tag is scanned and/or in response to another input indicating that the consumable 130 has been replaced. For example, the user may be instructed to scan the tag (or other indicia) for a fresh consumable 130 when replacing a spent consumable with the fresh consumable 130. When replacing a consumable 130 with the same type of consumable, the user may be permitted to input an indication that the same type of consumable is being used for replacement, in lieu of scanning the tag. The workpiece 320 may be identified by its indicia, such as a barcode, a multi-dimensional barcode such as, for example, a QR code, etc. attached to it.

In other examples in which the consumable 130 is tagged with a unique code, the processing circuitry 110 stores the usage data for the consumable 130 in the memory 112 in association with the code. Thus, if the consumable 130 is removed and then replaced onto the equipment 100, the usage data is restored for further tracking by the usage monitor.

In an example, the consumable 130 is a hardness test block that may be used for calibrating a hardness tester. The test block may be identified by a corresponding tag or indicia, such as a barcode, a multi-dimensional barcodes such as, for example, a QR code, etc. Based on the tag or indicia, the equipment 100 determines acceptable calibration test result ranges, acceptable test parameters for the test block, use limit for the test block (e.g., based on indentation counts, indentation parameters, and/or upper indentation density limit for the test block), and/or other information for monitoring the consumption of the test block. The example equipment 100 also stores monitored usage information in the memory 112 in association with the unique identifier of the test block, which may be recalled for subsequent uses of the test block and determination whether the test block has reached the end of operational life. The equipment 100 further compares calibration test results to permissible test results identified using the identifier. When the test results are out of this range, the equipment 100 may be calibrated and/or flagged for maintenance.

The tag reader 120 may transmit the data in the barcode 312 to the I/O interface 114, and the I/O interface 114, for example, stores the barcode data in the memory 112. The processing circuitry 110 then processes the barcode data, and stores the processed data in the memory 112. If the barcode data is determined to be a product number, the processing circuitry 110 can look for associated parameters for that product number. The associated parameters may be, for example, a diameter of the cutting wheel. The processing circuitry 110 may also determine, for example, from the product number that the type of workpiece that is to be cut may need to be identified. Accordingly, a barcode of the workpiece may be read by the tag reader 120. If the processing circuitry 110 determines additional information is needed, the request may be output via the output interface 220. The processing circuitry 110 can now control the rotational speed of the cutting wheel for the desired surface speed with the available information.

Figure 4:
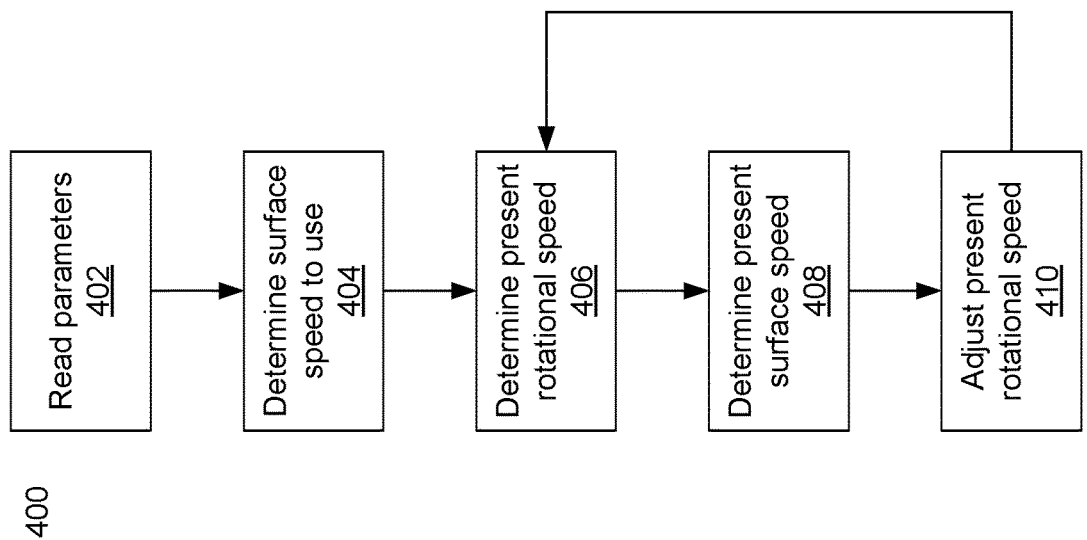
FIG. 4 is a flow diagram illustrating an example method of using equipment with a tag reader in accordance with aspects of this disclosure.

FIG. 4 is a flow diagram illustrating an example method of using equipment with a tag reader in accordance with aspects of this disclosure. Referring to FIG. 4, there is shown a flow diagram 400 with blocks 402 to 408. The example method may be implemented using machine readable instructions, which may be stored in the memory 112 and/or executed by the processing circuitry 110. The example method is described below with reference to the equipment 100 of FIGS. 1-3, where the consumable 130 is a cutting wheel.

In block 402, the tag reader 120 may be used to read, for example, the barcode 312 to determine the initial parameters associated with the consumable 130. For example, for the consumable 130 (the cutting wheel), the parameters may include information such as, for example, abrasive material type on the cutting wheel, size of the cutting wheel, concentration of the abrasive material on the cutting wheel, thickness of the cutting wheel, bonding agent material type, and/or bonding agent material hardness. Additionally, further information may be read in via the tag reader 120. This information may be about the item being cut. The information may be, for example, a part number of the item being cut, material makeup of the item being cut, etc.

At block 404, a surface speed to use for the product 310 (the cutting wheel) may be determined from the various parameters read with the tag reader 120. At block 406, the equipment 100 may determine the present rotational speed of the product 310 to see if it is in acceptable margins. At block 408, the present surface speed may be determined. This may be done, for example, by determining the cutting wheel size, and, hence its circumference, and multiplying the circumference by the rotational speed.

At block 410, the rotational speed of the cutting wheel 108 may be adjusted to bring the surface speed to the desired speed. When the surface speed is within a desired tolerance and does not need to be adjusted, the next step may be to back to block 406.

Figure 5:
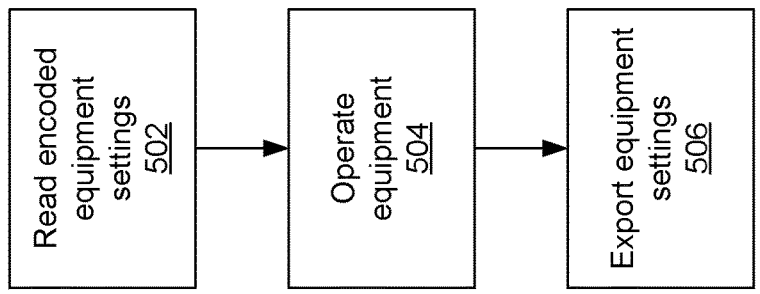
FIG. 5 is a flow diagram illustrating an example method of using equipment with a tag reader to generate equipment settings in accordance with aspects of this disclosure.

FIG. 5 is a flow diagram illustrating an example method of using equipment with a tag reader to generate equipment settings in accordance with aspects of this disclosure. Referring to FIG. 5, there is shown a flow diagram 500 with blocks 502 to 506. The example method of FIG. 5 may be implemented using machine readable instructions, which may be stored in the memory 112 and/or executed by the processing circuitry 110. The example method shown in the flow diagram 500 may use the tag reader 120 to read, for example, parameters as described with reference to FIG. 4 or encoded settings for setting up the equipment 100. The parameters or the encoded settings may be encoded as an RFID tag, an NFC tag, a barcode, a multi-dimensional barcode such as, for example, a QR code, etc.

At block 502, parameters or the encoded settings may be read by the tag reader 120 and used to set up the equipment 100. At block 504, the equipment 100 may be used to perform the desired operation. For example, if the equipment 100 is a cutting device with a cutting wheel, the equipment 100 may be set for a specific surface speed for cutting a sample. However, in other cases, the equipment 100 may not be operated, but only used to generate equipment settings. At block 506, the equipment settings may be exported. This may occur regardless of whether the equipment 100 was operated.

The equipment settings may be encoded by the processing circuitry 110 and transmitted via the transceiver 230 to various devices. For example, the equipment settings may be transmitted to other machines directly, to a printer to print barcodes or multi-dimensional barcodes such as, for example, QR codes to be read by other similar machines, to a display of a portable device such as a cell phone, a laptop, a tablet computer, etc. so that the encoded setup information can be scanned. The equipment settings may also be sent to appropriate devices to encode an RFID tag, an NFC tag, etc.

The equipment settings may also be listed in, for example, alphanumeric characters and transmitted for manual entry in other machines. This may comprise, for example, sending to a printer to be printed, or sending to a display of an electronic device to be displayed while an operator enters the settings. The electronic device may be a machine that is to be set up or a device such as, for example, a cell phone, a laptop, a personal computer, a tablet computer, etc.

Other embodiments may encompass transmitting the settings to be encoded by another device that then encodes the settings, and prints the barcode/QR code or encodes the settings in an RFID tag, an NFC tag, etc., for reading by for example, the tag reader 120 of an equipment 100.

Different examples may also allow different forms of inputs to be entered. For example, the tag reader 120 of an equipment 100 may read machine settings from a barcode, then additional information may be read for specific consumables and/or workpiece (or sample). The processing circuitry 110 of the equipment 100 may then process all the input and may modify the machine settings read from the barcode as needed.

Figure 6:
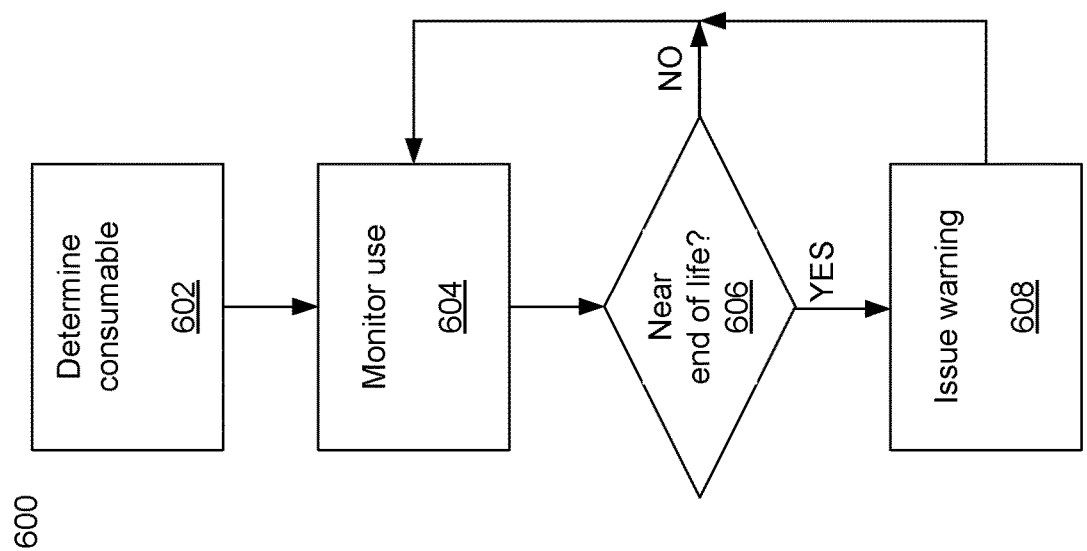
FIG. 6 is a flow diagram illustrating another example method of using equipment with a tag reader in accordance with aspects of this disclosure.

FIG. 6 is a flow diagram illustrating another example method of using equipment with a tag reader in accordance with aspects of this disclosure. Referring to FIG. 6, there is shown a flow diagram 600 with blocks 602 to 608. The example method of FIG. 6 may be implemented using machine readable instructions, which may be stored in the memory 112 and/or executed by the processing circuitry 110.

At block 602, the tag reader 120 of an equipment 100 may read, for example, the barcode 312 of the consumable 130. The consumable 130 and its usage may be identified via the barcode 312.

At block 604, the product 300 may be used in operation of the equipment 100. The operation may comprise, for example, polishing a workpiece. The processing circuitry 110 may keep track of how long the product 300 is in use. At 606, when the processing circuitry 110 determines that the product 300 is reaching the end of its life, for example, by the amount of time it was in use, then at 608 the processing circuitry 110 may output an alert via, for example, the output interface 220. Then the process may return to monitoring at block 604.

At block 608, various embodiments may, rather than continue to monitor at 604, terminate operation. This may be due to concern that continuing operation may damage the equipment 100 or the workpiece. Various embodiments may also allow some multiple number of warnings before terminating operation.

Figure 7:
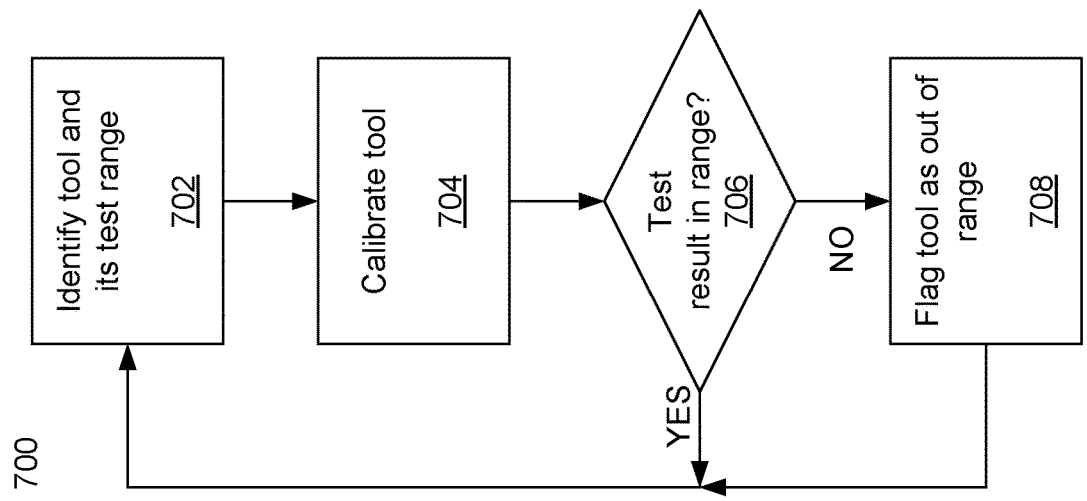
FIG. 7 is a flow diagram illustrating another example method of using equipment with a tag reader in accordance with aspects of this disclosure.

FIG. 7 is a flow diagram illustrating another example method of using equipment with a tag reader in accordance with aspects of this disclosure. Referring to FIG. 7, there is shown a flow diagram 700 with blocks 702 to 708. The example method of FIG. 7 may be implemented using machine readable instructions, which may be stored in the memory 112 and/or executed by the processing circuitry 110. At block 702, a particular consumable (e.g., the consumable 130) may be identified by reading, for example, a tag that may be attached to the consumable 130. The tag may also have, for example, an acceptable calibration result range for that consumable 130. At block 704, the equipment 100 is calibrated using the consumable 130, and at block 706 the results of the calibration are compared with the acceptable calibration result range for the consumable 130. If the calibration is within the acceptable calibration result range, then the process may proceed to step 702 for the next consumable 130 and/or equipment 100. If the calibration is not within the acceptable calibration result range, then the process may proceed to block 708. At block 708, the consumable 130 and/or the equipment 100 may be flagged as being out of range. The flagging may be, for example, a warning on the output interface 220, such as, for example, a video display. The process may then continue at block 702 with the next consumable 130 and/or equipment 100 to be calibrated.

A database may also be updated to keep track of all the consumables. This may give a history, for example, of the consumables being calibrated. The database may be exported to characterize the consumables. The database may be exported, for example, by transmitting it using the transceiver 230. The format of the data may be pre-arranged depending on the receiving entity. The database may then be used by the receiving device to analyze the consumables and their calibration history.

Accordingly, it can be seen that various embodiments of the disclosure may disclose a method for handling data by a materials preparation and analysis equipment, where the method comprises receiving, by the equipment, indicia associated with a consumable used by the equipment. The method may further comprise identifying, by the equipment, one or more parameters associated with the consumable based on the indicia. The indicia may be processed by processing circuitry in the equipment to identify the one or more parameters. The one or more parameters may then be used to control the equipment.

The indicia may be stored in memory. Identifying may comprise decoding information encoded in the indicia. The encoded setup information may be in one or both of: barcode and a multi-dimensional barcode. The received information may be received from a tag reader and/or via a transceiver.

One or more parameters may be encoded as encoded setup information, where the encoded setup information may be transmitted, for example, to another electronic device. The encoded setup information may be one or both of: a barcode and a multi-dimensional barcode.

The indicia may include an identifier of a tool and an acceptable calibration result range for the tool. The tool may be calibrated, and the calibration result may be compared to the acceptable calibration result range. When the calibration result is not in the acceptable calibration result range, the tool may be flagged as being out of calibration. For example, the tool may be flagged by displaying a warning on a video output device.

Various embodiments of the disclosure may disclose a materials preparation and analysis equipment that includes processing circuitry, memory, and an input/output interface comprising a tag reader where the equipment may be configured to receive information via the input/output interface.

The input/output interface may also comprise a transceiver, and the equipment may be configured to receive information via one or both of: the tag reader and the transceiver. The information may be regarding one or more of: the equipment, a consumable used by the equipment, a workpiece for the equipment, and a tool. At least a part of the information may be in an indicia in the form of, for example, one or both of: a barcode and a multi-dimensional barcode.

The processing circuitry may be used to decode the encoded information. The information may be processed to be at least a portion of setup information for the equipment.

Accordingly, the present methods and systems may be realized in hardware, software, and/or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A combination of hardware and software may include a general-purpose computing system with a specific program or other code that, when being loaded and executed, controls the computing system such that it carries out the methods described herein. Another implementation may comprise one or more application specific integrated circuit or chip designed for cutting/abrading tools. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What are claimed:

1. A method for handling data by a materials preparation and analysis equipment, comprising:
   receiving, via one or more tag readers, first indicia from a first tag that is associated with a consumable used by the materials preparation and analysis equipment and second indicia from a second tag that is associated with a workpiece or a test sample of the materials preparation and analysis equipment;
   identifying via processing circuitry operably coupled to the one or more tag readers, one or more consumable parameters of the consumable based on the first indicia, wherein the one or more consumable parameters includes at least one of a size, a shape, or a material type of the consumable;
   identifying, via the processing circuitry operably, one or more parameters of the workpiece or the test sample based on the second indicia, wherein the one or more parameters includes at least one of a size, a shape, or a material type of the workpiece or the test sample;

automatically controlling the materials preparation and analysis equipment based on one or both of the one or more consumable parameters and the one or more parameters;

monitoring a monitored parameter of the consumable during operation of the materials preparation and analysis equipment, wherein the monitored parameter includes an amount of time that the consumable has been used; and determining, via the processing circuitry, whether the consumable has reached its end of life based at least in part on both the monitored parameter of the consumable and at least one of the first indicia or the second indicia.

2. The method of claim 1, wherein the first indicia and the second indicia are stored in memory.

3. The method of claim 1, wherein the first indicia or the second is received via a transceiver.

4. The method of claim 1, wherein identifying the one or more consumable parameters comprises decoding information encoded in the first indicia.

5. The method of claim 4, wherein the encoded information is decoded from one or both of a barcode and a multi-dimensional barcode.

6. The method of claim 1, comprising encoding the one or more parameters as encoded setup information.

7. The method of claim 6, wherein the setup information is encoded to one or both of a barcode and a multi-dimensional barcode.

8. The method of claim 6, comprising transmitting the encoded setup information.

9. The method of claim 1, wherein the first indicia provides an identifier for a tool and an acceptable calibration result range for the tool.

10. The method of claim 9, comprising:
calibrating the tool;
comparing a calibration result to the acceptable calibration result range; and
flagging the tool as out of calibration when the calibration result is not in the acceptable calibration result range.

11. The method of claim 10, wherein flagging comprises displaying a warning on a video output device.

12. A materials preparation and analysis equipment, comprising:
processing circuitry;
a memory operatively coupled with the processing circuitry; and
an input/output interface operatively coupled with the processing circuitry and comprising one or more tag readers,
wherein the one or more tag readers are configured to read first indicia from a first tag that is associated with a consumable used by the materials preparation and analysis equipment and to read second indicia from a second tag that is associated with a workpiece or a test sample of the materials preparation and analysis equipment,
wherein the processing circuitry is configured to identify, from the first indicia received from the tag, one or more parameters of the consumable that reflects at least one of a size, a shape, or a material type of the consumable, to control the materials preparation and analysis equipment based on the one or more parameters, and to monitor a parameter of the consumable during operation of the materials preparation and analysis equipment, wherein the parameter of the consumable includes an amount of time that the consumable has been used, and
wherein the processing circuitry is configured to determine whether the consumable has reached its end of life based at least in part on the parameter of the consumable and at least one of the first indicia or the second indicia.

13. The materials preparation and analysis equipment of claim 12, wherein the input/output interface comprises a transceiver, and the materials preparation and analysis equipment is configured to receive the first indicia or the second indicia via one or both of the tag reader and the transceiver.

14. The materials preparation and analysis equipment of claim 13, wherein the first indicia and the second indicia are in the form of one or both of a barcode and a multi-dimensional barcode.

15. The materials preparation and analysis equipment of claim 13, wherein the first indicia or the second indicia is encoded.

16. The materials preparation and analysis equipment of claim 15, wherein the processing circuitry decodes the first indicia or the second indicia.

17. The materials preparation and analysis equipment of claim 16, wherein the decoded indicia is at least a portion of setup information for the materials preparation and analysis equipment.

18. A materials preparation and analysis equipment, comprising:
a tag reader configured to read indicia from at least one of a plurality of tags, wherein the plurality of tags comprises a first tag that is associated with a consumable used by the materials preparation and analysis equipment and a second tag that is associated with a workpiece or a test sample of the materials preparation and analysis equipment, wherein the first tag reflects at least one of a size, a shape, or a material type of the consumable and the second tag reflects at least one of a size, a shape, or a material type of the workpiece or the test sample; and
processing circuitry operatively coupled with a memory and the tag reader,
wherein the memory comprises equipment parameters for the materials preparation and analysis equipment,
wherein the processing circuitry is configured to identify one or more equipment parameters based on the indicia received from the at least one of a plurality of tags and to control the materials preparation and analysis equipment based on the one or more equipment parameters, and
wherein the processing circuitry is configured to determine whether the consumable has reached its end of life based at least in part on the one or more parameters and a monitored parameter of the consumable that reflects an amount of time that the consumable has been used.

19. The materials preparation and analysis equipment of claim 18, wherein the processing circuitry is operatively coupled with the tag reader via a transceiver.

* * * * *